(12) United States Patent
Oh et al.

(10) Patent No.: US 11,931,849 B2
(45) Date of Patent: Mar. 19, 2024

(54) BLOCKING DEVICE AND METHOD

(71) Applicant: HUVITZ CO., LTD., Gyeonggi-do (KR)

(72) Inventors: Dong Kun Oh, Gyeonggi-do (KR); Jin Ho Kim, Gyeonggi-do (KR)

(73) Assignee: HUVITZ CO., LTD., Gyeonggi-Do (KR)

( * ) Notice: Subject to any disclaimer, the term of this patent is extended or adjusted under 35 U.S.C. 154(b) by 626 days.

(21) Appl. No.: 17/186,384

(22) Filed: Feb. 26, 2021

(65) Prior Publication Data

US 2021/0339355 A1 Nov. 4, 2021

(30) Foreign Application Priority Data

Apr. 29, 2020 (KR) .......................... 10-2020-0051933
Feb. 3, 2021 (KR) .......................... 10-2021-0015665

(51) Int. Cl.
*B24B 13/005* (2006.01)
*B29D 11/00* (2006.01)

(52) U.S. Cl.
CPC .... *B24B 13/0055* (2013.01); *B29D 11/00942* (2013.01)

(58) Field of Classification Search
CPC .............. B24B 13/0055; B24B 13/005; B24B 13/0052; B24B 13/0057; B24B 9/146;
(Continued)

(56) References Cited

U.S. PATENT DOCUMENTS 5,027,492 A * 7/1991 Chansavoir ............. B24B 9/146
29/281.5
7,884,928 B2 2/2011 Mizuno et al.
(Continued)

FOREIGN PATENT DOCUMENTS

EP 1093907 A2 4/2001
EP 1842622 A1 10/2007
(Continued)

OTHER PUBLICATIONS

European Search Report dated Oct. 1, 2021 for European patent application No. 21158476.8.
(Continued)

*Primary Examiner* — Joel D Crandall
*Assistant Examiner* — Michael A Gump
(74) *Attorney, Agent, or Firm* — Nath, Goldberg & Meyer; Jerald L. Meyer; Tanya E. Harkins

(57) ABSTRACT

A blocking device and method for mounting a leap block to a lens by a lifting/lowering mechanism using a magnet and a wire is described comprising a blocking device housing having a guide; a movable leap block attachment part mounted on the guide of the housing; a spring having a lower end supporting the attachment part and an upper end supporting the blocking device housing, the spring pushing the attachment part downward, so that the attachment part protrudes below the lower end of the blocking device housing; a wire having one end connected to a pulley and the other end connected to the attachment part, so the wire pulling the attachment part upward when the pulley rotates; a leap block attached to the lower end of the attachment part by magnets; and a blocking arm coupled to the housing and to move the housing up and down.

5 Claims, 4 Drawing Sheets

(58) Field of Classification Search
CPC .............. B24B 41/06; B29D 11/00942; G02C 2200/02
USPC ........................................................ 451/390
See application file for complete search history.

(56) References Cited

U.S. PATENT DOCUMENTS

| | | | | |
|---|---|---|---|---|
| 2004/0156612 | A1* | 8/2004 | Mizushima .......... | G02B 6/2555 385/137 |
| 2007/0226991 | A1* | 10/2007 | Matsuyama ........ | B24B 13/0055 29/700 |
| 2014/0315472 | A1* | 10/2014 | Schneider ............... | B24B 47/22 156/64 |
| 2016/0363142 | A1* | 12/2016 | Yeung ................... | F16B 7/0426 |

FOREIGN PATENT DOCUMENTS

| KR | 10-2001-0108000 A | 12/2001 |
|---|---|---|
| KR | 101327238 B1 | 11/2013 |

OTHER PUBLICATIONS

Office Action for Korean patent application No. 10-2021-0015665 dated Dec. 11, 2022 and English machine translation thereof.

* cited by examiner

BLOCKING DEVICE AND METHOD

CROSS-REFERENCE TO RELATED APPLICATION

This application claims benefit of priority to Korean Patent Applications Nos. 10-2020-0051933 and 10-2021-0015665 filed on Apr. 29, 2020 and Feb. 3, 2021, respectively, the entire contents of which are incorporated herein by reference.

FIELD OF THE DISCLOSURE

The present invention relates to a blocking device and method, and more particularly, to a blocking device and method for mounting a leap block to a lens by utilizing a lifting/lowering mechanism using a magnet and a wire.

BACKGROUND

Eyeglasses are made by fitting lenses for correcting vision into an eyeglass frame selected by a consumer. In order to manufacture eyeglasses, it is necessary to machine the outer shape of lenses sold in a circular shape, i.e., blank lenses so as to conform to an eyeglass frame, and to this end, such apparatus as a tracer, a blocker, a lens machining tool, and so on is used. A tracer is an apparatus for reading the shape of an eyeglass frame, and a lens machining tool is an apparatus for machining blank lenses into the shape of the eyeglass frame. A blocker is an apparatus for attaching a leap block (or connecting block) to a machining reference point of a blank lens (See Korean Patent No. 10-1327238 and U.S. Pat. No. 7,884,928). Once the leap block is attached to the blank lens, the blank lens is mounted to a clamp of the lens machining tool via the leap block, and the blank lens is machined into the shape of the eyeglass frame.

FIG. 1 is a cross-sectional view showing the structure of a conventional blocker. As shown in FIG. 1, in the conventional blocking device 10, a leap block 51 is fitted into a leap block mount 7 by using a ball plunger 2 having a ball 3 mounted at a distal end thereof. Further, a supporting pin 5 that moves up and down is mounted to the leap block mount 7. A compression spring (not shown) is mounted at the rear end of the supporting pin 5, so that when a force is applied from below the supporting pin 5 and the supporting pin 5 is pressed, a restoring force corresponding to the applied force is generated. When the leap block mount 7 is lowered and the leap block 51 is attached to a lens (not shown), the supporting pin 5 that touches the lens is pressed to thereby move upward, and the spring at the rear end of the supporting pin 5 is compressed. Thereafter, when the leap block mount 7 is raised, the supporting pin 5 pushes the lens downward by the elastic force of the spring, so that the leap block 51 departs from the ball plunger 2, and the lens whose leap block 51 is blocked is separated from the leap block mount 7.

However, since such a conventional blocking device 10 mechanically fixes the leap block 51 with the ball plunger 2, the leap block 51 is not fixed well to the leap block joint 7 when the leap block 51 is worn, and thus there is a problem that the ball 3 of the ball plunger 2 needs to be re-adjusted or the leap block 51 or the ball plunger 2 must be replaced.

PRIOR ART LITERATURE

Patent Documents (Patent Document 1) Korean Patent No. 10-1327238
(Patent Document 2) U.S. Pat. No. 7,884,928

SUMMARY OF THE INVENTION

Technical Objects

It is an object of the present invention to provide a blocking device and method capable of mounting a leap block by utilizing a lifting/lowering mechanism using a magnet and a wire.

Technical Solution

In order to achieve the object above, the present invention provides a blocking device 100 comprising: a blocking device housing 41 having a guide 31 formed therein; a leap block attachment part 21 mounted to be movable up and down on the guide 31 of the blocking device housing 41; a spring 61 having a lower end that supports the leap block attachment part 21 and an upper end that supports the blocking device housing 41, the spring 61 pushing the leap block attachment part 21 downward by an elastic force, so that a lower end of the leap block attachment part 21 protrudes below a lower end of the blocking device housing 41; a wire 11 having one end connected to a pulley 15 driven by driving means 93 and the other end connected to the leap block attachment part 21, the wire 11 pulling the leap block attachment part 21 upward when the pulley 15 rotates; a leap block 51 attached to the lower end of the leap block attachment part 21 by an attractive force of magnets; and a blocking arm 71 coupled to the blocking device housing 41 and configured to move the blocking device housing 41 up and down.

Further, the present invention provides a method of blocking a lens, comprising: in a state in which a leap block attachment part 21, which is mounted to be movable up and down on a guide 31 located inside a blocking device housing 41, is exposed below the blocking device housing 41, attaching a leap block 51 to the leap block attachment part 21 by an attractive force of magnets; fixing the leap block 51 to a lower end of the blocking device housing 41 by moving the leap block attachment part 21 upward; attaching the leap block 51 to a lens by positioning the lens under the blocking device housing 41 and lowering the blocking device housing 41; detaching the leap block attachment part 21 from the fixed leap block 51 by further raising the leap block attachment part 21; and obtaining a lens having the leap block 51 attached thereto, by raising the blocking device housing 41 to thereby separate the blocking device housing 41 and the leap block 51.

Effects of the Invention

According to the blocking device and method in accordance with the present invention, the leap block can be easily attached to a lens. Further, according to the blocking device and method in accordance with the present invention, it is possible to reduce the fixation of the device or wear of the components.

DETAILED DESCRIPTION OF THE PREFERRED EMBODIMENTS

Figure 1:
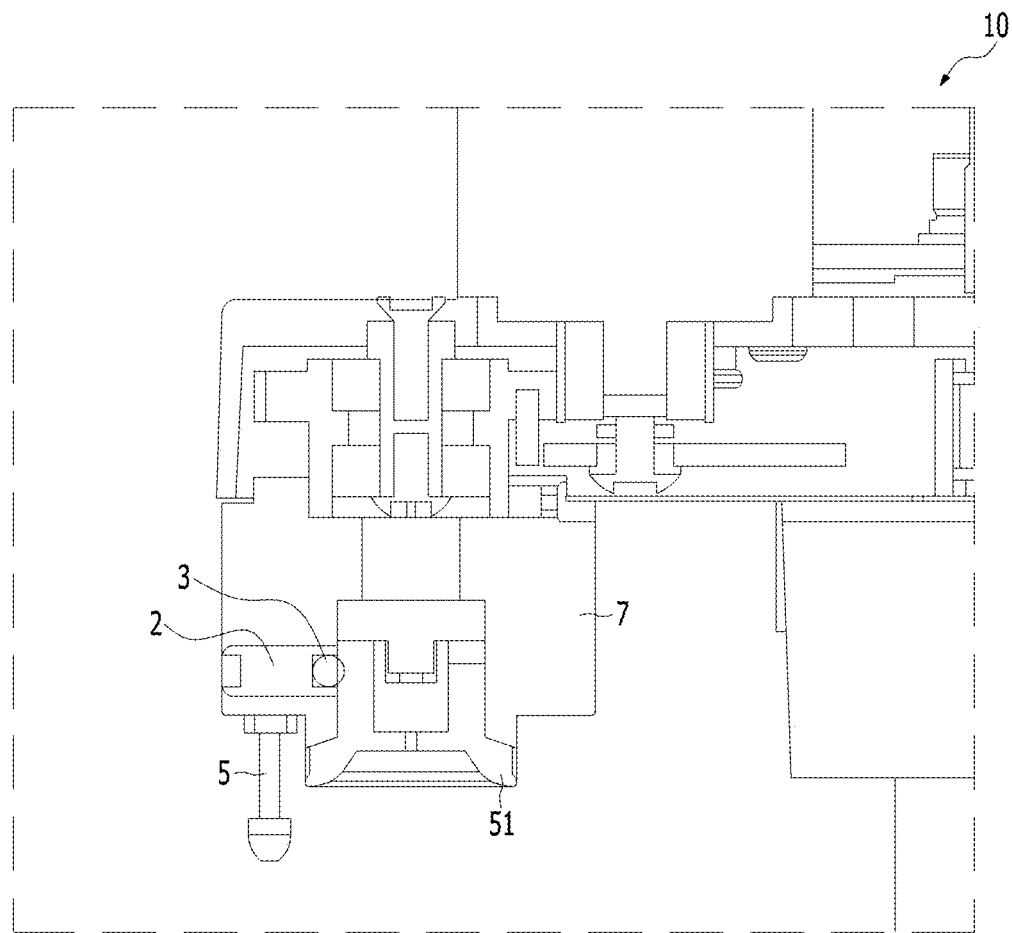
FIG. 1 is a cross-sectional view showing the structure of a conventional blocker.

Hereinafter, the present invention will be described in detail with reference to the accompanying drawings. In the accompanying drawings, like reference numerals are assigned to elements that carry out the same or similar functions as conventional elements. In the present specification, a downward direction indicates a direction in which a blank lens is located, i.e., a direction in which a leap block is attached to a blank lens, an upward direction indicates a direction in which the leap block is located, and left and right directions indicate the left direction and the right direction, respectively, on the basis of the drawing.

Figure 2:
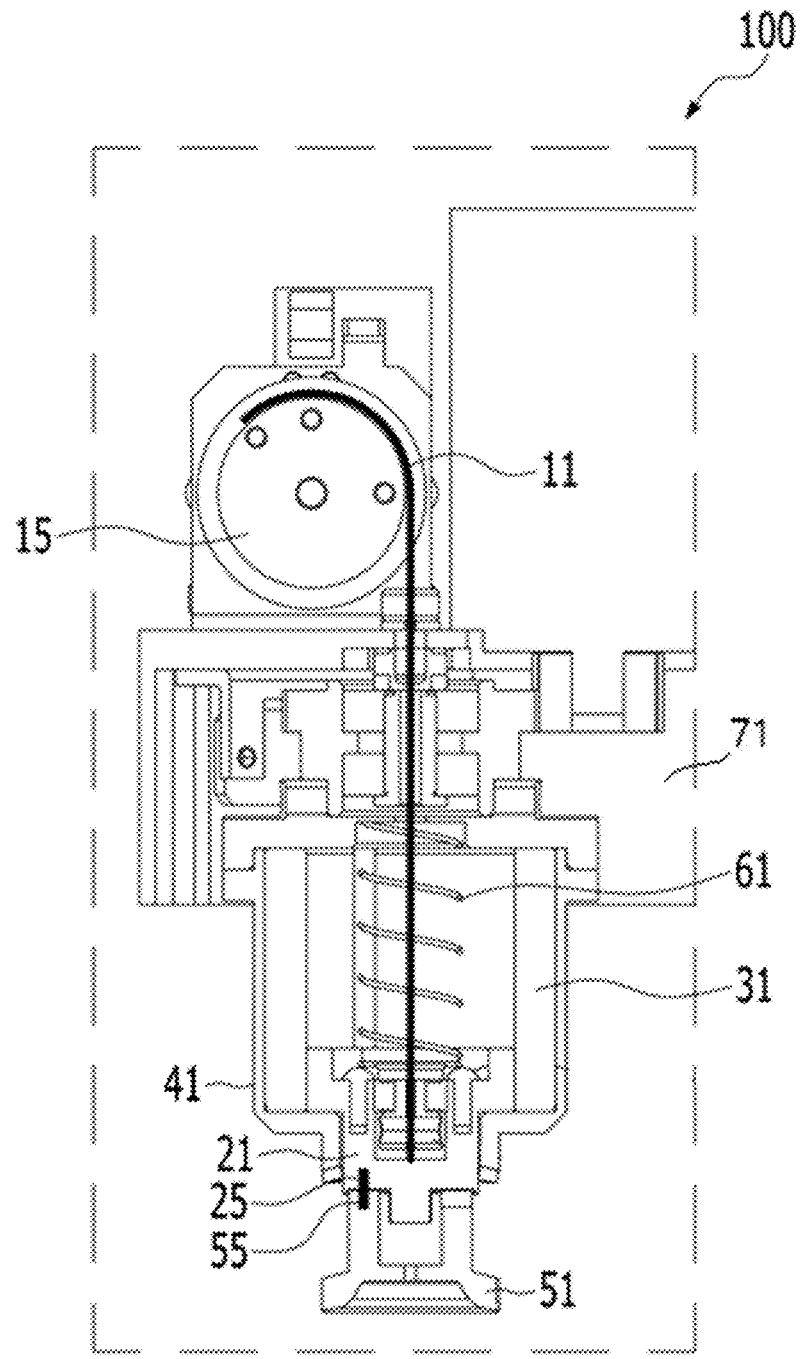
FIG. 2 is a view showing an internal structure of a blocking device 100 of a blocker in accordance with an embodiment of the present invention.
Figure 3:
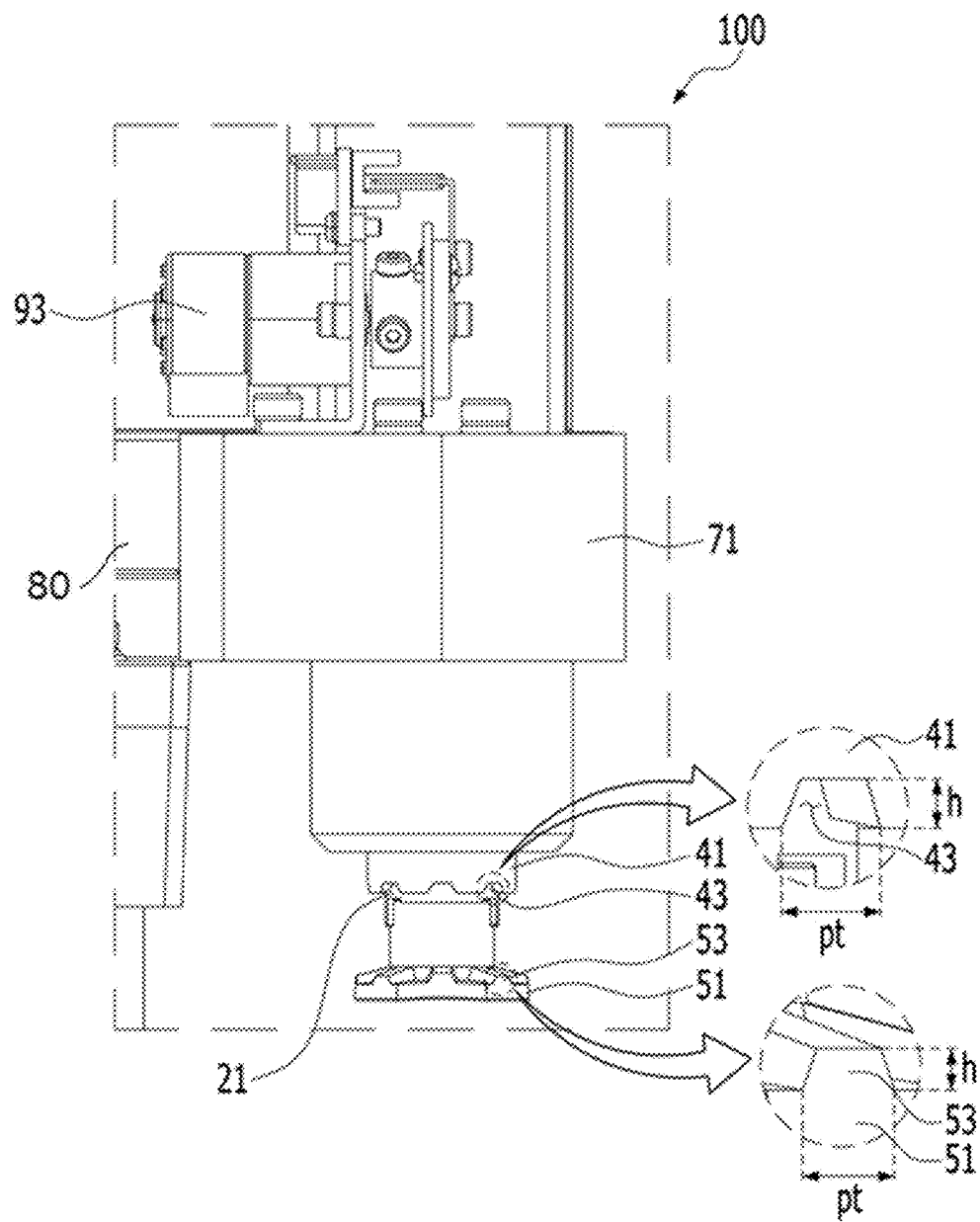
FIG. 3 is a view showing an external structure of a blocking device 100 of a blocker in accordance with an embodiment of the present invention.
Figure 4:
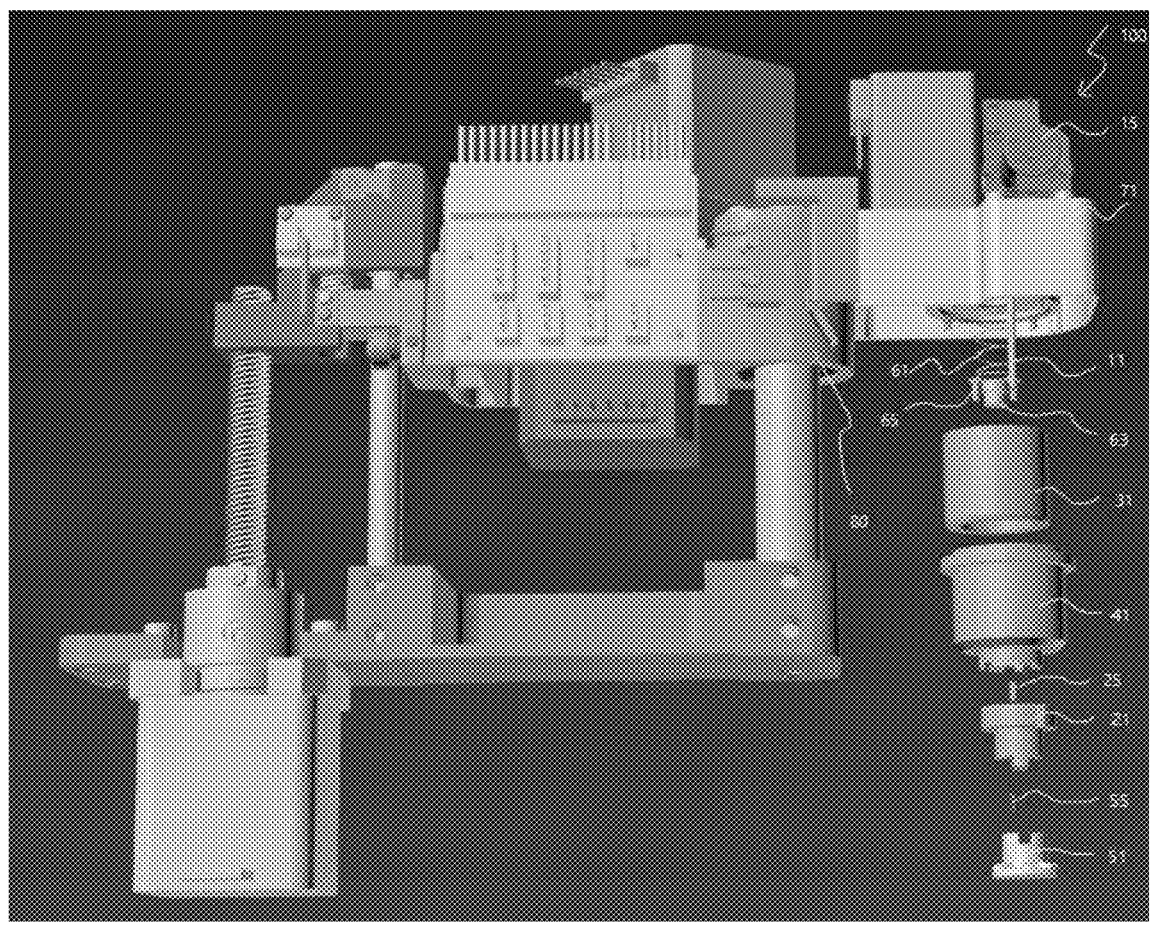
FIG. 4 is a view showing an overall configuration and a disassembled state of a blocker in accordance with an embodiment of the present invention.

FIGS. 2 and 3 are, respectively, views showing an internal structure and an external structure of a blocking device 100 of a blocker in accordance with an embodiment of the present invention. FIG. 4 is a view showing an overall configuration and a disassembled state of a blocker in accordance with an embodiment of the present invention. Referring to FIG. 4, the blocker comprises a blocking device 100 configured to attach a leap block 51, and a blocker body 80 configured to drive the blocking device 100 in the up and down direction. Referring to FIGS. 2 and 3, the blocking device 100 in accordance with an embodiment of the present invention includes a blocking device housing 41 having a guide 31 formed therein, a leap block attachment part 21, a spring 61, a wire 11, a leap block 51, and a blocking arm 71.

The leap block attachment part 21 is mounted to be movable up and down on the guide 31 located inside the blocking device housing 41. In other words, the guide 31 receives the leap block attachment part 21 and guides the up and down movement of the leap block attachment part 21.

The lower end of the spring 61 supports the leap block attachment part 21 and the upper end thereof supports the blocking device housing 41, so that the leap block attachment part 21 is pushed downward by the elastic force of the spring 61, specifically the restoring force of the compression spring, and the lower end of the leap block attachment part 21 has a structure protruding below the lower end of the blocking device housing 41.

One end of the wire 11 is connected to a pulley 15 driven by driving means 93 such as a step motor, and the other end is connected to the leap block attachment part 21. When the pulley 15 rotates and the wire 11 is wound around the pulley 15 and is raised, the leap block attachment part 21 is pulled upward.

That is, the leap block attachment part 21 is maintained to protrude below the lower end of the blocking device housing 41 by the elastic force of the spring 61, but is pulled upward when the wire 11 is raised with a force stronger than the elastic force of the spring 61.

The leap block 51 and the leap block attachment part 21 are detachably attached by the attractive force of magnets. For example, a first magnet 25 is mounted on one side of the lower end of the leap block attachment part 21 and a second magnet 55 is mounted on one side of the upper end of the leap block 51, so that the leap block attachment part 21 and the leap block 51 are detachably coupled by the attractive force of the magnets 25 and 55.

The blocking device housing 41 is coupled with the blocking arm 71, and the blocking arm 71 is mounted to be movable up and down on the blocker body 80 of the blocker, thereby moving the blocking device housing 41 up and down (see FIG. 4).

The driving means 93 rotates the pulley 15 to thereby pull the wire 11 wound around the pulley 15, causing the leap block 51 attached to the leap block attachment part 21 to be in close contact with the blocking device housing 41. A step motor capable of adjusting the length of the wire 11 stepwise may be used as the driving means 93.

Referring to FIG. 3, a first tooth 43 is formed at the lower end of the blocking device housing 41. In addition, a second tooth 53 having a shape to be meshed with the first tooth 43 of the blocking device housing 41 is formed at the upper end of the leap block 51, so that the leap block 51 and the lower end of the blocking device housing 41 are detachably coupled. In this case, the first tooth 43 and the second tooth 53 have a shape such as a triangle, a rhombus etc. so that the leap block 51 is detachably coupled in close contact with the lower end of the blocking device housing 41. In this case, the first teeth 43 of the blocking device housing 41 and the second teeth 53 of the leap block 51 may have the same pitch interval pt and step height h.

Referring to FIGS. 2 to 4, the upward movement of the leap block attachment part 21 may be performed by a pulley driving method using the wire 11. Preferably, the upward movement of the leap block attachment part 21 is performed stepwise. The wire 11 is driven stepwise by the driving means 93, and moves the leap block attachment part 21 stepwise to (1) a first position where the leap block 51 is fixed to the blocking device housing 41 and (2) a second position where the leap block attachment part 21 is detached from the fixed leap block 51.

In operation, when the wire 11 is in a lowered state, the leap block attachment part 21 is exposed below the blocking device housing 41 by the elastic force (restoring force) of the spring 61. The leap block 51 is attached by the attractive force of the magnets 25 and 55 to the leap block attachment part 21 exposed as such. Next, the wire 11 is pulled upward to the first position (the position where the leap block 51 is fixed to the lower end of the blocking device housing 41), thereby moving the leap block attachment part 21 upward until the second tooth 53 of the leap block 51 attached to the leap block attachment part 21 and the first tooth 43 at the lower end of the blocking device housing 41 are meshed and fixed. Thereafter, the lens is positioned under the leap block 51, and the blocking arm 71 is lowered to cause the blocking device housing 41 to be lowered, thereby attaching (adhering) the leap block 51 to the lens. After blocking is performed in this way, when the wire 11 is again pulled further upward to the second position (the position where the leap block attachment part 21 is detached from the fixed leap block 51) to raise the leap block attachment part 21 further, the leap block attachment part 21 is detached from the fixed leap block 51 and is raised. At this time, the force for pulling the wire 11 to the second position must be greater than the sum of the attractive force of the magnets 25 and 55 and the restoring force of the spring 61. In addition, if the leap block attachment part 21 is not sufficiently separated from the fixed leap block 51, there may be a problem that the leap block 51 is raised together with the blocking device housing 41 when raising the blocking device housing 41 later. As such, if the blocking arm 71 is raised to thereby raise the blocking device housing 41 after the leap block attachment part 21 is moved away from the leap block 51, the attractive force between the leap block attachment part 21 and the leap block 51 is weakened, and accordingly, the leap block 51 can be easily separated from the blocking device housing 41 and a lens having the leap block 51 attached thereto can be obtained.

According to the present invention, since the leap block 51 is attached to the leap block attachment part 21 by magnetic force rather than mechanically fitting manually by an operator, it is convenient to mount the leap block 51. In addition, after attaching the leap block 51, the wire 11 is pulled upward to the first position, and the leap block 51 is fixed to the blocking device housing 41. Thereafter, the blocking device housing 41 to which the leap block 51 is fixed is lowered, and the leap block 51 is attached to the lens. In this way, since the wire 11 is further pulled upward to the second position to thereby separate the leap block 51 and the leap block attachment part 21 with the leap block 51 fixed to the lens, the leap block attachment part 21 may be stably separated from the leap block 51.

In other words, the leap block 51 is mounted to the leap block attachment part 21 with the attractive force of the magnets 25 and 55 at a position where the leap block attachment part 21 protrudes downward from the blocking device housing 41. Next, the leap block 51 is fixed to the blocking device housing 41 by raising the leap block attachment part 21 via the wire 11 connected to the driving means 93, such as a step motor. Thereafter, if the wire 11 is wound further to thereby raise the leap block attachment part 21 further after blocking the lens, the leap block 51 cannot go up any further by being caught by the blocking device housing 41 and is gradually separated further away from the leap block attachment part 21, and thus, the magnetic force between the first magnetic body 25 of the leap block attachment part 21 and the second magnetic body 55 of the leap block 51 is weakened. Therefore, when the blocking arm 71 moves to an initialization position (upper position), the leap block 51 and the lens are easily separated from the blocking device housing 41.

The blocking device 100 of the blocker of the present invention improves the mounting convenience of the leap block 51 by using the lifting/lowering mechanism utilizing the wire 11 and the spring 61 and the detachable attachment mechanism utilizing the magnets 25 and 55. Since the blocking device 100 of the blocker in accordance with the present invention fixes the leap block 51 by using magnetic force, it is convenient to attach and detach the leap block 51.

Although the blocking device of the blocker and the method of controlling the same in accordance with the present invention have been described above with reference to specific embodiments, the present invention is not limited to the specific embodiments described above and various modifications are possible within the scope set forth in the following claims.

The invention claimed is:

1. A blocking device (100) comprising:
 a blocking device housing (41) having a guide (31) formed therein;
 a leap block attachment part (21) mounted to be movable up and down on the guide (31) of the blocking device housing (41);
 a spring (61) having a lower end that supports the leap block attachment part (21) and an upper end that supports the blocking device housing (41), the spring (61) pushing the leap block attachment part (21) downward by an elastic force, so that a lower end of the leap block attachment part (21) protrudes below a lower end of the blocking device housing (41);
 a wire (11) having one end connected to a pulley (15) driven by driving means (93) and the other end connected to the leap block attachment part (21), the wire (11) pulling the leap block attachment part (21) upward when the pulley (15) rotates;
 a leap block (51) attached to the lower end of the leap block attachment part (21) by an attractive force of magnets; and
 a blocking arm (71) coupled to the blocking device housing (41) and configured to move the blocking device housing (41) up and down.

2. The blocking device (100) of claim 1, wherein the leap block attachment part (21) protrudes below the lower end of the blocking device housing (41) by the elastic force of the spring (61), and when the wire (11) is raised with a force stronger than the elastic force of the spring (61), the leap block attachment part (21) is pulled upward.

3. The blocking device (100) of claim 1, wherein the wire (11) is driven stepwise by the driving means (93), and moves the leap block attachment part (21) stepwise to (1) a first position where the leap block (51) is fixed to the blocking device housing (41) and (2) a second position where the leap block attachment part (21) is detached from the fixed leap block (51).

4. The blocking device (100) of claim 1, wherein a first tooth (43) is formed at the lower end of the blocking device housing (41), and a second tooth (53) having a shape to be meshed with the first tooth (43) of the blocking device housing (41) is formed at an upper end of the leap block (51), so that the leap block (51) and the blocking device housing (41) are detachably coupled.

5. A method of blocking a lens, comprising:
 in a state in which a leap block attachment part (21), which is mounted to be movable up and down on a guide (31) located inside a blocking device housing (41), is exposed below the blocking device housing (41), attaching a leap block (51) to the leap block attachment part (21) by an attractive force of magnets;
 fixing the leap block (51) to a lower end of the blocking device housing (41) by moving the leap block attachment part (21) upward;
 attaching the leap block (51) to the lens by positioning the lens under the blocking device housing (41) and lowering the blocking device housing (41);
 detaching the leap block attachment part (21) from the fixed leap block (51) by further raising the leap block attachment part (21); and
 obtaining a lens having the leap block (51) attached thereto, by raising the blocking device housing (41) to thereby separate the blocking device housing (41) and the leap block (51).

* * * * *